S. D. POOLE.
WHEELED CULTIVATOR.
APPLICATION FILED APR. 11, 1910.
1,075,937.
Patented Oct. 14, 1913.
6 SHEETS—SHEET 3.
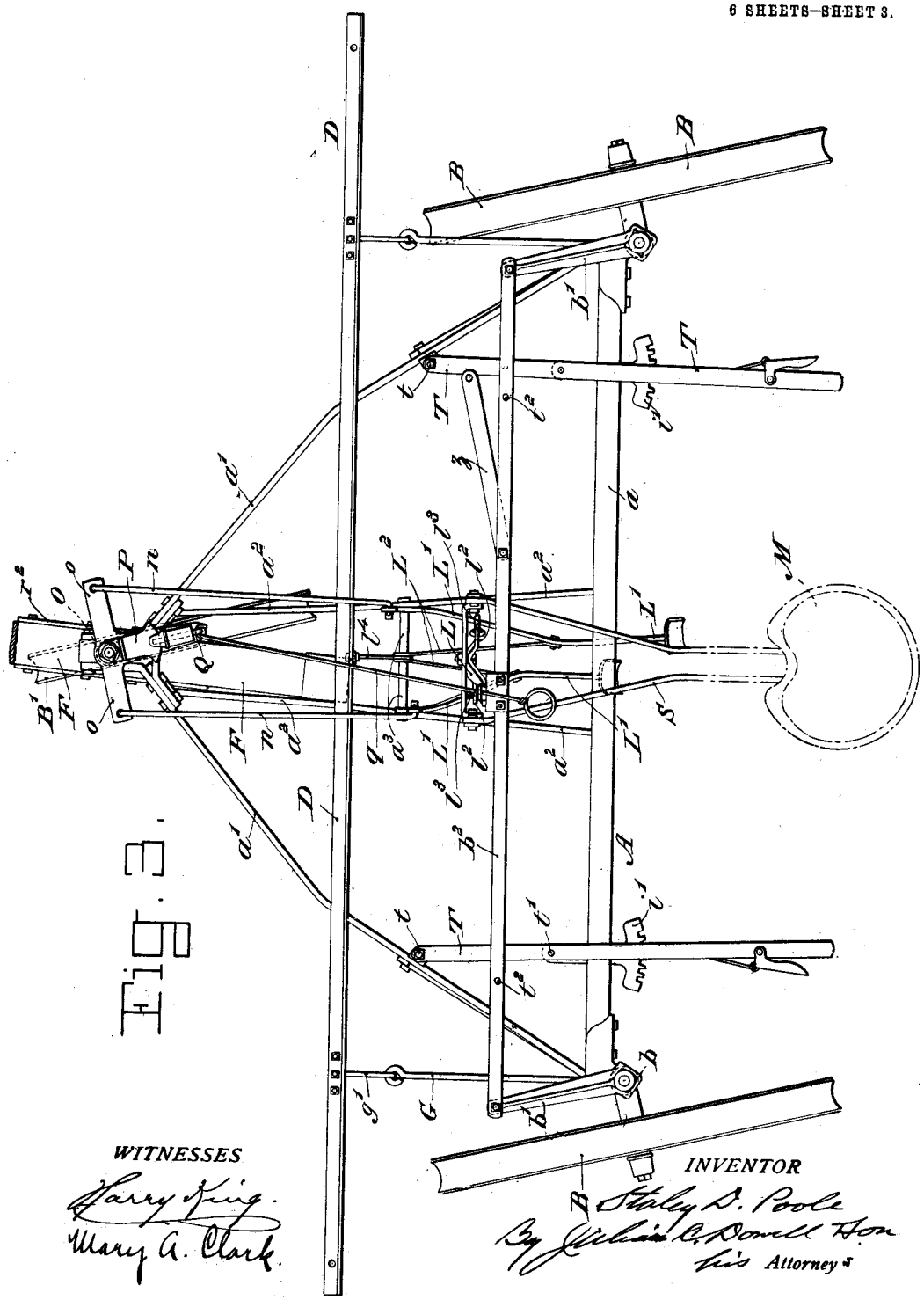
WITNESSES
INVENTOR

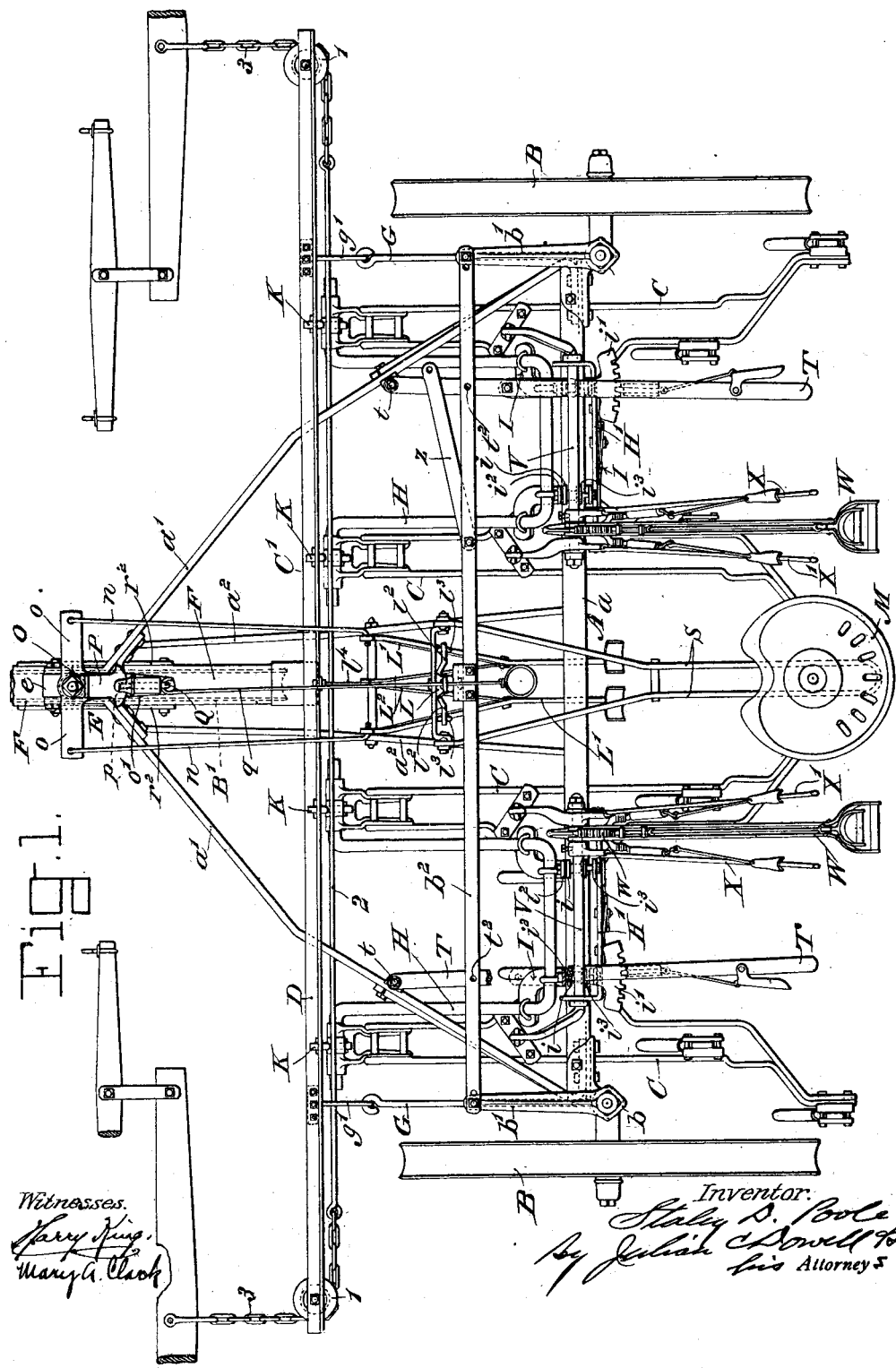

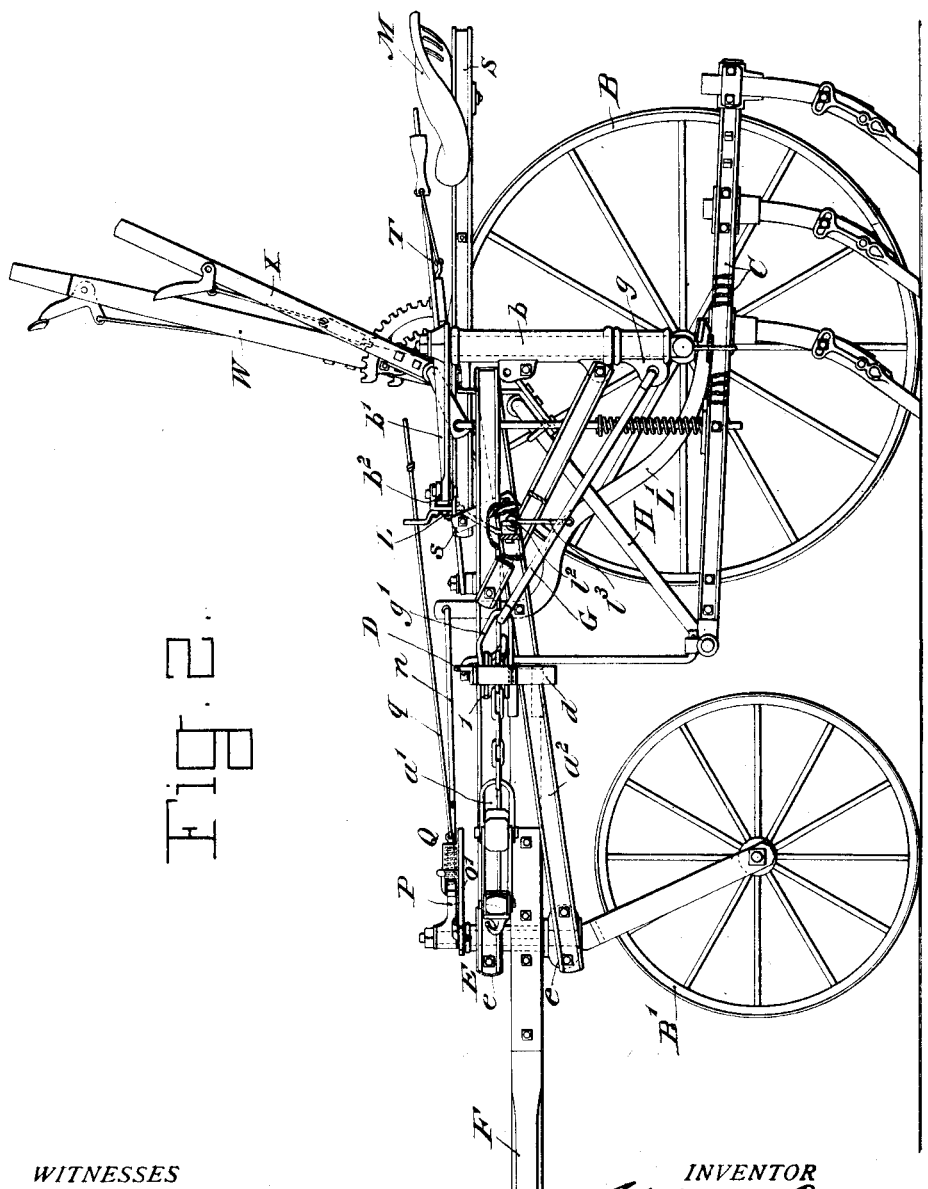

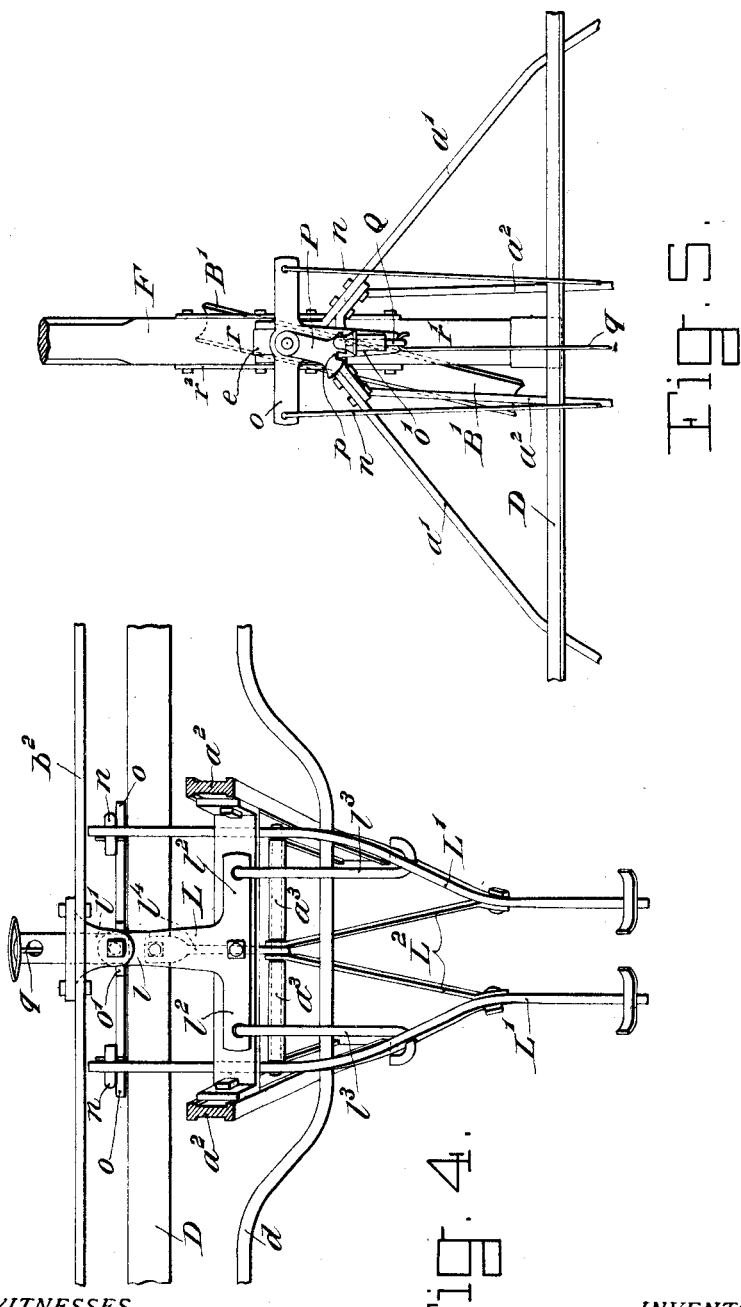

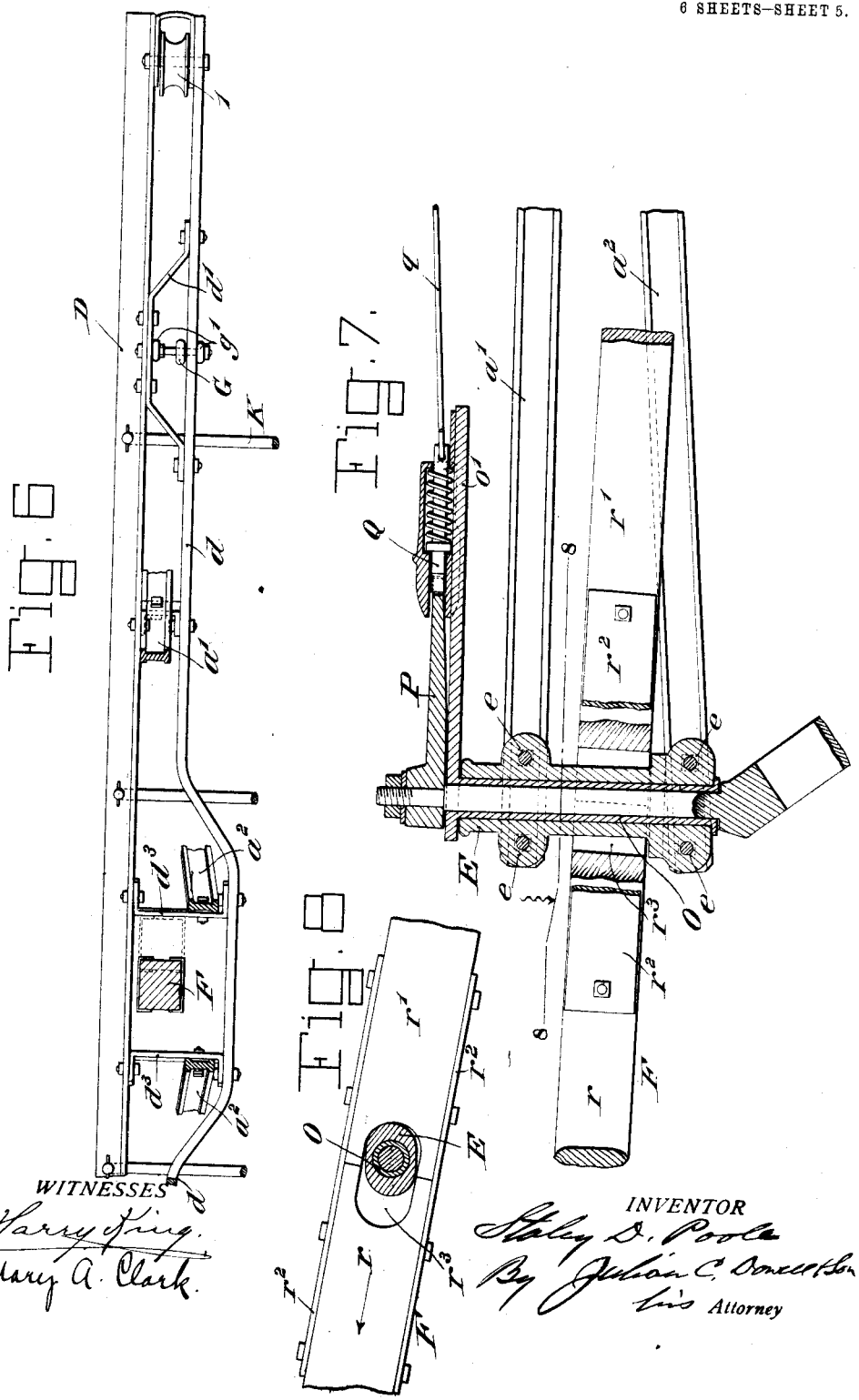

S. D. POOLE.
WHEELED CULTIVATOR.
APPLICATION FILED APR. 11, 1910.

1,075,937.

Patented Oct. 14, 1913.

6 SHEETS—SHEET 6.

WITNESSES
Harry King.
Mary G. Clark.

INVENTOR
Staley D. Poole
By Julian C. Dowell
his Attorneys

UNITED STATES PATENT OFFICE.

STALEY D. POOLE, OF MOLINE, ILLINOIS, ASSIGNOR TO DEERE & COMPANY, OF MOLINE, ILLINOIS, A CORPORATION OF ILLINOIS.

WHEELED CULTIVATOR.

1,075,937.  Specification of Letters Patent.  Patented Oct. 14, 1913.

Application filed April 11, 1910. Serial No. 554,622.

*To all whom it may concern:*

Be it known that I, STALEY D. POOLE, a citizen of the United States, residing at Moline, in the county of Rock Island and State of Illinois, have invented certain new and useful Improvements in Wheeled Cultivators; and I do hereby declare the following to be a full, clear, and exact description of the invention, such as will enable others skilled in the art to which it appertains to make and use the same.

This invention relates to cultivators, and more particularly to that class of machines in which gangs of plows or cultivating devices are connected with a wheeled supporting frame and known in the art as a wheeled cultivator.

The main object of the invention is to provide an improved double-row cultivator having three pivoted supporting and guiding wheels connected and adapted to operate in unison for steering purposes, together with foot-levers or treadles for operating said wheels.
Other objects are to provide a locking and releasing device for the middle front or pilot wheel, to adapt it to be disconnected from the side wheels and allowed to "caster" or turn freely when turning at the ends of the rows or furrows and to be automatically locked so as to again turn in unison with the side wheels when the machine is moving straight ahead; also a pivoted tongue having a limited longitudinal and sidewise swinging movement adapting it to aid in steering, the front wheel spindle being conveniently employed as a pivotal point about which the tongue may swing; also means for connecting the rig-shifting levers with the steering mechanism so as to enable the operator to turn the three steering wheels in unison and at the same time shift the cultivator gangs or rigs laterally in one operation.
The invention will first be hereinafter more particularly described, with reference to the accompanying drawings, which are to be taken as a part of this specification, and then pointed out and defined in the claims at the end of the description.

Figure 9:
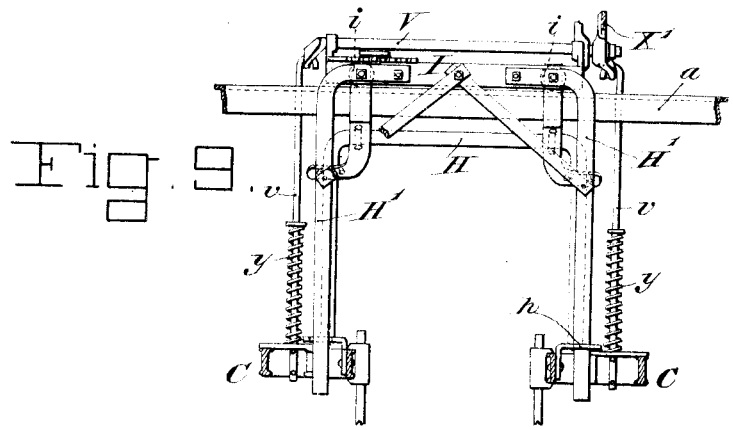
Figure 10:
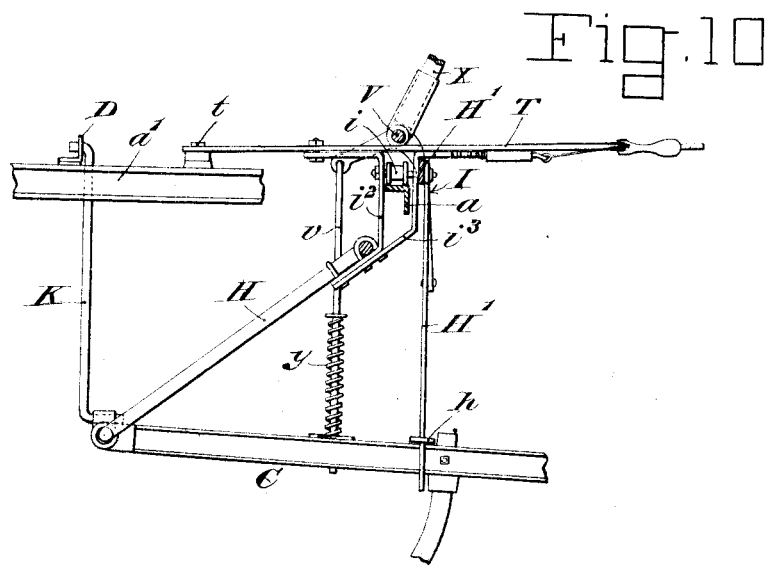
Figure 11:
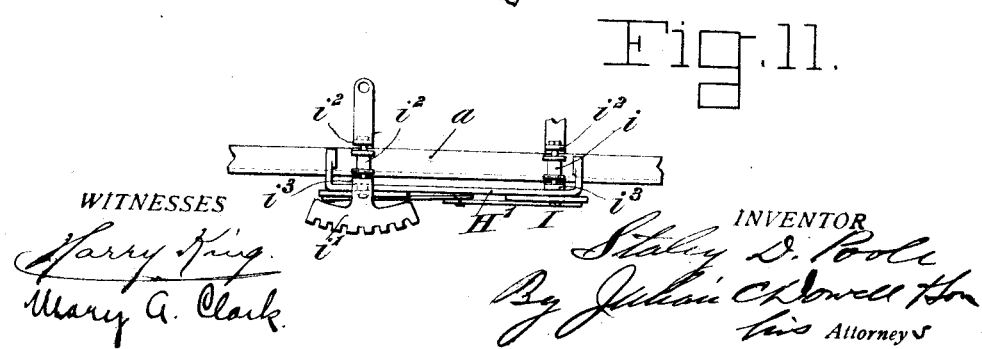

In said drawings, Figure 1 is a plan view of a three wheeled cultivator embodying my invention; Fig. 2 is a side elevation of the same; Fig. 3 is a plan view of the wheeled supporting frame and steering mechanism, omitting the cultivator gangs and elevating devices and their connections; Fig. 4 is a detail view, partly in section, of a fragmentary portion of the machine, showing the foot-levers or treadles and coöperating devices for turning the three pivoted wheels in unison; Fig. 5 is a detail plan view of a portion of the forepart of the machine, showing the locking device for the front steering wheel; Fig. 6 is a detail sectional view of a part of the machine frame illustrating an evener or draft-bar combined with and forming a part of the frame construction; Fig. 7 is a detail sectional elevation of parts forming the pivotal connection between the tongue and front steering wheel, and means for locking said wheel so as to cause it to be turned in unison with the side wheels while adapted to be disconnected from the steering mechanism to permit it to turn or caster freely independently of the side wheels in turning; Fig. 8 is a fragmentary plan view illustrating the pivotal connection between the tongue and front steering-wheel spindle; Fig. 9 is a rear elevation, partly in section, of a portion of the machine, showing the sliding trolley-frame and parts connected therewith; Fig. 10 is a side elevation of the parts shown in Fig. 9, and Fig. 11 is a detail plan view of the sliding trolley-frame.

I have illustrated a preferred form of embodiment of the invention in connection with a series of rigs or gangs of ordinary cultivating devices suspended from the wheeled frame and adapted for use as a double-row cultivator, but it will be understood, of course, that the invention may be embodied in various forms and a greater or less number of plows or cultivators may be employed without departing from the spirit and scope of my invention, which is not limited in its application to any particular type of cultivating implements, any suitable device being comprehended in the use of the term "cultivator."

Referring to said drawings, in which the same reference letters are used to denote corresponding parts in different views, the letter A may denote a supporting frame having an arched axle with carrying wheels B, B, and gangs of plows or cultivators C, C, secured thereto or suspended therefrom as shown or in any suitable manner, for coöperation with the steering and guiding mechanism to be presently described. As shown the axles of the side wheels B, B, are each rigid with an upright spindle or standard which is fitted in a tubular bracket-bearing $b$ attached to the rear cross-bar $a$ of the machine frame, which cross-bar together with said tubular brackets form the arched axle beneath which the gangs of cultivating devices are arranged and connected with the supporting frame in such manner as to adapt them to be raised and lowered as desired for regulating the depth of penetration and transporting the machine from place to place in the usual way.

A suitable distance in front of the rear cross-bar $a$ is placed a frame-bar D, preferably constructed of angle-iron and serving as a draft-bar or evener. The bars $a$ and D are connected by diagonally arranged frame-bars $a^1$, which are preferably constructed of channel iron, and converge from the axle or bracket-bearings $b$ to a bracket-bearing E, in which the spindle of the front steering wheel $B^1$ is fitted, thus forming a substantially triangular frame, to which the cultivators may be connected. Intermediate braces $a^2$, preferably of channel iron, may extend from a point about midway of the rear arched axle cross-bar to the lower end of the bracket-bearing E, and the members $a^1$, $a^2$, are secured to said bracket-bearing E, one above and the other below the tongue or pole F, by bolts entering apertured lugs or ears $e$, $e$, which project from the bracket-bearing in opposite directions, as shown more clearly in Fig. 7 of the drawings. The cross-bar and evener D is connected with the arched axle by a draft-rod G, at each side, preferably having a hook at one end engaging an eye on a socket $g$, fitted on the standard or upright spindle of the side wheel B, and a hook at the other end engaging a loop or clevis $g^1$ secured to the cross-bar and evener D.

The cultivator gangs are pivotally connected at their forward ends to the laterally projecting arms of a bail H, one at each side of the machine, carried by a sliding trolley-frame I, which is mounted on the rear cross-bar $a$, and also to depending hangers K, which have a pivotal connection at their upper ends with the frame-bar and evener D, to adapt them to swing toward either side, to permit the gangs to move laterally. Underneath and parallel with the frame-bar and evener D may be secured a brace $d$, by means of diagonal braces $d^1$, at each side of the center, and vertical braces $d^3$ at the center, thereby forming a very strong and durable yet simple and inexpensive frame construction, which will serve also as an evener. The lower bar or brace $d$ may be bent downward centrally to provide a space between the two bars sufficient to permit a limited vertical movement of the rear end of the tongue F, which is confined between said bars D and $d$ and said braces $d^3$. The intermediate frame bars $a^2$ may also be bolted to said braces $d^3$.

Each of the vertical arms or spindles of the side wheels B carries a crank-arm $b^1$ which, in the form shown, projects forwardly, and the two crank-arms are connected by a transverse rod or bar $b^2$ which is movable endwise to cause the side wheels to turn in unison. In order that the front wheel may also turn in unison with the two side wheels I provide a foot-lever-operated steering mechanism which may be constructed as follows: To a cross-bar connecting the frame bars $a^2$ at a convenient point is pivoted a rocking-lever L, having an upstanding arm $l$ pivoted to a depending lug $l^1$ on the endwise movable bar $b^2$ (Figs. 1, 3, and 4), and lateral arms $l^2$ each connected by a pendent rod or link $l^3$ with one of a pair of foot-levers or treadles $L^1$ which are pivotally supported on the machine frame, preferably by a bolt connecting the bars or braces $a^2$ and having sleeves $a^3$ thereon which separate the foot-levers from intermediate braces $L^2$. The braces or supports $L^2$ are each pivoted at one end to one of the foot-levers $L^1$ and the other ends thereof are secured on the pivot-bolt carrying the sleeves $a^3$. And a brace-rod or bar $l^4$ connects said pivot-bolt with the cross-bar and evener D thus bracing and sustaining the foot-levers against lateral and endwise movement or thrust. The foot-levers $L^1$ extend from a point within convenient reach of the feet of the driver sitting on the seat M to a point slightly above the pivot of the levers, being preferably curved upwardly to the point of connection with the links $l^3$ and extending thence in a reverse curve to the pivot-bolt and from the latter point upwardly to a rod $n$ to which the upstanding end of the foot-lever is pivoted. The opposite end of the rod $n$ is connected with a laterally projecting arm $o$ of an approximately T-shaped head-piece on the upper end of a sleeve O in which the spindle of the front steering wheel $B^1$ is journaled; the said sleeve O being fitted in the tubular bracket-bearing E so that it may turn therein in unison with the spindle when locked thereto and permit the spindle to turn independently of the sleeve when the spindle is unlocked. To this end a rearwardly projecting arm P is fixed on the upper end of the spindle and has an arc-shaped end which is notched as at $p$ for engagement with a sliding spring-pressed dog Q which is carried by a rearwardly extending arm $o^1$ on the head-piece of the sleeve O and provided with a hand-operated connecting rod $q$ extending rearwardly to a point within convenient reach of the driver and having a suitable handle to enable the driver to disconnect the latch or dog from the arm P and permit the wheel B¹ to caster or turn freely toward either side, when the machine is being turned at the ends of the rows or furrows. The arm P being fixed on the spindle of the wheel B¹ will turn in unison therewith and when locked to the arm o¹ will keep the wheel B¹ in line with the wheels B, thus causing all three wheels to operate in unison and to be turned toward either the right or the left for steering purposes, by the manipulation of the foot-levers L¹, one of which is depressed while the other rises in turning the machine to the right or left. As shown, the tongue F is constructed in two parts r, and r¹, secured together by metallic straps r² and bolts passing through holes in said straps and through registering holes in the tongue. The adjoining ends of the two parts r, r¹ of the tongue may be recessed so that when brought together such recesses will form a slightly elongated slot or opening r³ to receive the correspondingly shaped body of the bracket-bearing E, whereby the tongue is permitted to swing sidewise to the same degree that the wheels turn for steering purposes, and thereby aid in the steering; the pull of the team causing the tongue to swing to either side when turning. The sidewise movement or swing of the tongue is limited by contact of the rear end thereof with one of the stops formed by the braces d³, and vertical movement or swing of the tongue is limited by contact of its rear end with one of the stops formed by the upper and lower members of the cross-bar and evener D. This connection also permits sufficient longitudinal movement to adapt the tongue to swing sidewise just to the degree that the wheels turn and no farther, and it is free to swing at all times within the limits permitted by its slotted and pivotal connection with the steering wheel spindle and the stops between which its rear end is confined.

The seat M is mounted upon or secured to a bar S which is bent upon itself and has its ends bolted or otherwise secured to links s rising from the frame-bars a² while the rearwardly projecting and folded portion of the seat-bar forms a slot or guide-way to receive a fastening bolt underneath the seat which may be slid along said bar for securing the seat at any desired point, to accommodate drivers of different weights; a suitable washer or plate and fastening device or nut being secured on the free end of said fastening bolt underneath the seat-bar.

The trolley-frames I, I, which carry the bails H, H, also carry yokes H¹, H¹, having pendant arms each fitted in an eye or slot in a plate h carried by the adjacent rig or gang C, whereby the rigs at opposite sides of the machine may be shifted bodily laterally, for wider or narrower spacing, or for varying the width between rows. As will be seen, the slotted plates accommodate the vertical movements of the cultivator beams and also hold them to the trolley frames, and as the trolley frames are moved laterally the cultivator gangs will also be shifted laterally bodily, so that by shifting the trolley frames the gangs of cultivators may be readily adjusted to the spacing of the rows. Rollers i on the trolley frame and suitably journaled therein rest upon the rear cross-bar a, to reduce friction, and said frame may be formed or provided with a rearwardly projecting ratchet or rack i¹ preferably an integral part thereof, for engagement with a pawl or sliding dog on the rig-shifting lever T. The axles of the rollers i are conveniently journaled in the trolley frame-bars i² and i³, which are arranged one on each side of the cross-bar a, so as to hold the trolley-frame in position on said bar when moving toward either side, and extend downwardly to the bail H, which is secured thereto to adapt it to move laterally with the trolley-frame. Levers T each have a pivotal connection at one end with one of the frame bars, as at t, and a pivotal connection, as at t¹, with the sliding trolley frame, so that the latter may be moved toward either the right or the left, for shifting the rigs laterally, by operating said lever T. After making the desired adjustment the lever may be locked by means of the spring-pressed dog thereon engaging the rack i¹ on the sliding trolley frame.

A rock-shaft V journaled on the trolley frame has a crank-arm at one end rigid therewith and at the other end a crank-arm sleeved thereon, and from each of said crank-arms is suspended a rod v the lower end of which is pivotally secured to one of the rigs C. A master-lever W, loose on the rock-shaft, is adapted to be locked in any desired position, by a pawl or sliding dog thereon engaging a rack w on the rock-shaft. Beside the rack w are placed two levers X, and X¹, each provided with a pawl or sliding dog engaging a rack beside the lever W, so that the levers X and X¹ may be locked to the lever W to cause the three levers to move together, at the same time rocking the shaft in its bearings and simultaneously raising or lowering the two rigs, according to the direction in which the master-lever is turned. The lever X is fast on the rock-shaft so as to turn therewith for independent adjustment of the rig with which the fixed-arm of the shaft is connected, while the lever X¹ is secured to the crank-arm which is loose on the shaft in order to provide for independent adjustment of the rig with which said loose crank-arm is connected, and so long as the two levers X and X¹ are locked to the lever W the three levers will move together, simultaneously raising or lowering both rigs, but either lever X or X¹ may be unlocked and operated to raise or lower the rig with which it is connected and thereby vary the depth of penetration beyond the adjustment provided by the master lever operating simultaneously on both rigs. A coiled spring $y$ may be fitted on each of the rods $v$, between a shoulder thereon and the rig, so as to hold the latter yieldingly down to its work.

As stated, the transverse frame-bar D serves also as an evener or draft-bar, and to this end a sheave or pulley 1 is journaled between the upper and lower members of said frame-bar, at or near each end, and a flexible connection, such as a rod 2 and chains 3, at the ends of the rod, may extend around the pulleys for connection with a double-tree or other draft device at each end of said flexible connection.

It will be observed that the foot-levers are used for steering and guiding purposes, through their connections with the three steering and supporting wheels, which may be thus operated quickly and in unison, for "dodging" purposes. It may be desirable, at times, to steer all three wheels by the foot-pedals and at the same time shift the rigs in one operation, and to this end holes $t^2$ are provided in the connecting bar $b^2$, registering with holes in the levers T, T, so that by removing the pivot-bolts $t$, $t$, and inserting them in the holes $t^2$ the operator may steer all three wheels and at the same time shift the rigs laterally by manipulating the foot-pedals.

In order to avoid the necessity of a man riding on the machine to guide the wheels through the foot-pedals when the machine is being transported from field to field, or place to place, a strap Z may be provided having one end pivoted to the connecting bar $b^2$ and a hole in its free end adapted to be sprung over the end of the pivot-bolt $t$, of the rig-shifting lever T, and thereby hold the steering and guiding mechanism in a fixed position with all three wheels moving straight ahead.

The operation of the invention will be readily understood from the foregoing description, when taken in connection with the accompanying drawings, and further explanation is therefore deemed unnecessary. It will be readily noted, and especially upon referring to Figs. 1, 2 and 3, that I have provided a very compact and strong machine which may be turned in a small space and which will respond quickly to the movement of the steering mechanism so that very little labor is required of the operator. By locating the wheel $B^1$ in front of and between the side-wheels, the said front wheel serves as a tongue support, and also facilitates the making of a very short turn to either side when free to caster. The bar D forms a rigid part of the main frame so as to impart great strength thereto and also supports the draft devices so as to bring the application of the draft as near as possible to the cultivating devices. The number of parts of the machine is consequently reduced and brought into a very compact form, and as the draft devices are arranged in rear of the front steering wheel it will follow instantly the movement of the draft animals from side to side, so as to effect the desired short turning. As shown, the foot levers for actuating the steering mechanism are pendant levers so hung on the main frame as to extend under the arched axle in the position in which they may be most conveniently reached by the driver and most comfortably and easily operated by him. This arrangement also aids in producing a very compact machine and in increasing its efficiency.

Having thus described my invention, what I claim as new and desire to secure by Letters Patent of the United States is:

1. A wheeled cultivator having three pivoted supporting and guiding wheels connected and adapted to operate in unison for steering purposes, one being a front pilot wheel between the lines of travel of the other two wheels, together with a pair of independent but co-acting vertically swinging foot levers having their longer arms depending from the wheeled supporting frame below the driver's seat and connected with the rear wheels and their shorter arms connected with said pilot wheel for turning said wheels through said connections.

2. A wheeled cultivator having three pivoted supporting and guiding wheels, arranged one upon each side and one in advance of and between the lines of travel of the other two, connections between the three wheels for operating them in unison, and foot-levers included in said connections, said foot-levers being pivoted on the machine frame with their longer arms depending below the driver's seat and their shorter arms upstanding and connected with the foremost wheel for turning it and the other two wheels simultaneously toward either side.

3. In combination, a wheeled supporting frame having three pivoted supporting and guiding wheels, arranged one at each side of said frame and the third wheel about midway thereof at the front, means connecting the two side wheels to adapt them to turn in unison, and means connecting said third wheel with said side-wheel-connecting means, including a pair of vertically swinging foot-levers connected with said third wheel for operating all three wheels in unison.

4. The combination in a cultivator of a frame mounted on three supporting and guiding wheels, each adapted to be turned toward either the right or the left and arranged one at each side of the machine and the third wheel midway the sides of the machine in advance of the other two, a pair of vertically swinging pendant foot-levers and connections between the same and said side wheels for turning the latter in unison, and connections between said foot-levers and said third wheel for turning the latter in unison with the two side wheels.

5. The combination in a cultivator of a frame having three guiding and supporting wheels arranged one at the front and one at each side, the side-wheels having uprights or standards rotatably secured to said frame and provided with crank-arms, a transverse bar connecting said crank-arms and movable lengthwise for turning the side wheels in unison, a pendant vertically swinging foot-lever and connections between the same and said transverse bar for moving the latter lengthwise, and connections between said foot-lever and said front wheel for turning the latter in unison with said side wheels.

6. A wheeled cultivator having three pivoted supporting and guiding wheels connected and adapted to operate in unison for steering purposes, one a leading or pilot wheel and the other two being rear side wheels following paths at opposite sides of the path of the leading wheel, together with pendant vertically swinging foot-levers for operating said wheels, and means for disconnecting the leading wheel to permit it to turn freely independently of the other two wheels, said means being adapted to automatically lock said leading wheel in normal position adapting it to turn in unison with the other two wheels when the machine is moving straight ahead.

7. In combination, a wheeled cultivator having a frame supported on three pivoted wheels arranged one at each side and a third wheel about midway thereof in advance of said side wheels, a foot-lever and connections between said foot-lever and said wheels for turning them in unison, and a locking device for said third wheel adapting it to be released and allowed to caster freely in turning and to be automatically locked and made to turn in unison with the other two wheels when the machine is moving straight ahead.

8. A wheeled cultivator having three pivoted supporting and guiding wheels and a pair of pendant swinging foot-levers and intermediate connections whereby said three wheels are operated in unison for steering purposes, together with means for disconnecting one of said wheels and allowing it to turn freely while the other two wheels are turned in unison by means of said foot-levers, said disconnecting means being adapted to automatically lock said third wheel on its return to normal position with the machine moving straight ahead and thereby cause the three wheels to again turn in unison.

9. A double-row cultivator having three pivoted wheels, one at each side of the machine and one at the front, each having a spindle rotatably secured in the machine frame, crank-arms on the spindles of said side wheels, a transverse connection between said crank-arms, a pair of foot-levers, a rocking-lever having an arm in pivotal connection with said transverse connection and laterally projecting arms, each having a pivotal connection with one of said foot-levers, and connections between said foot-levers and said front wheel, whereby the three wheels are adapted to operate in unison.

10. The combination, in a wheeled cultivator, of three pivoted supporting and steering wheels, one arranged at each side and one at the front, the latter having a spindle with a projecting arm, a connection between the two side wheels whereby they are adapted to operate in unison, a pair of foot-levers, a tri-armed rocking lever having one arm pivoted to said connection and laterally projecting arms each pivotally connected with one of said foot-levers, laterally projecting arms loose on the spindle of said front wheel each connected with one of said foot-levers and a rearwardly projecting arm rigid with said lateral arms and means thereon for locking it to said projecting arm on said front wheel spindle.

11. In a wheeled cultivator, a frame mounted on three supporting and guiding wheels pivotally secured thereto, one a pilot wheel arranged between the lines of travel of the rear wheels, connections between said wheels to cause them to turn angularly in unison, a tongue pivotally supported upon the pilot wheel and having a portion thereof projecting rearwardly beyond its pivot, and means on the frame engaged by said rearwardly projecting part to limit its lateral movement and adapt the tongue to aid in the steering.

12. In combination, a three-wheeled cultivator having three pivoted supporting and guiding wheels connected and adapted to operate in unison for steering purposes, one of said wheels being arranged about midway of the machine frame in advance of the other two and serving as a pole-truck and guiding wheel in one, means for disconnecting one of said wheels and allowing it to caster freely in turning, and a tongue having a pivotal connection with the spindle of one of said wheels and a limited sidewise movement to adapt it to aid in the steering.

13. In combination, a wheeled cultivator having three pivoted supporting and steering wheels and means for turning said wheels in unison, one of said wheels serving as a pole-truck, and a tongue having a pivotal connection with the spindle of one of said wheels adapting it to swing sidewise so as to aid in the steering; the rear end of said tongue being confined between stops which permit a limited vertical and sidewise movement.

14. In combination, a wheeled cultivator having three pivoted supporting and steering wheels, and mechanism including a pair of foot-levers for turning said wheels in unison, a series of cultivating devices or rigs connected with the wheeled supporting frame, hand levers for shifting said rigs laterally independently of said foot-lever-operated steering mechanism, and means for connecting said rig-shifting hand levers with said steering mechanism, whereby said wheels and rig-shifting levers may be simultaneously operated by means of said foot levers for turning the wheels and shifting the rigs in one operation.

15. In a cultivator, the combination with a transverse frame-bar, of a trolley-frame mounted on said frame-bar and movable laterally thereon, a downwardly and forwardly extending bail carried by said trolley frame, a downwardly extending yoke carried by the trolley-frame in rear of the bail, means for moving the trolley-frame, and beams supported at their forward ends by the lower ends of the bail and loosely engaging the lower ends of the yoke, together with lifting devices also carried by the trolley-frame.

16. In a cultivator, the combination of a tansverse frame-bar, a trolley-frame comprising front and rear members projecting above and below the frame-bar, travelers mounted between the upper ends of said members and resting on the frame-bar, a bail secured to and depending from the lower ends of said members, a yoke secured to and depending from the rear member, and beams having their front ends supported by the lower ends of the bail and engaging the yoke.

17. In a cultivator, the combination of front and rear transverse frame-bars, a trolley-frame suspended on the rear frame-bar, a downwardly and forwardly extending bail carried by the trolley-frame, a depending yoke carried by the trolley-frame in rear of the bail, means for moving the trolley-frame, cultivating devices having their beams pivoted to the lower forward ends of the bail and having a sliding engagement with the yoke, and links pivoted at their lower ends to the beams of said devices and at their upper ends to a front transverse frame-bar.

18. A cultivator having a frame comprising a rear transverse bar, forwardly converging bars secured to the ends of said transverse bar and a forward transverse bar rigid with said converging bars in rear of the front ends thereof, said forward transverse bar constituting a draft-bar, steering and supporting wheels on which the rear transverse bar is mounted, a steering and supporting wheel for the front ends of the converging bars, and connections between said wheels for moving them angularly in unison.

19. In a cultivator, the combination with a frame having forwardly extending converging frame-bars, of two side steering and supporting wheels pivotally secured to the frame, a pilot-wheel pivotally secured to the converging frame-bars in advance of the side wheels and substantially on the central longitudinal line of the frame, a T-shaped lever pivotally mounted on the frame, a connection between said side wheels pivotally connected to an arm of said lever, foot-levers pivoted on the frame and having their short arms projected above and their long arms below said frame, links connecting the lateral arms of the T-shaped lever with the long arms of said foot-levers, respectively, a T-shaped head-piece connected with the pilot-wheel, and connections between the short arms of the foot-levers and the lateral arms of said T-shaped head-piece whereby the several wheels may be turned angularly in unison.

20. In a cultivator, the combination of a frame having forwardly extending frame bars pivotally mounted upon side supporting wheels, a connection between the side wheels, a pilot-wheel pivoted at the front of the frame, a cross-bar connecting the said frame bars, a T-shaped lever pivoted upon said cross-bar and having a pivotal connection with said side wheel connection, pendant foot-levers pivoted upon the said frame bars, links connecting the lateral arms of the T-shaped lever with the respective pendant foot-levers, a T-shaped head-piece loosely mounted upon the pilot wheel, connections between the foot-levers and the lateral arms of the said head-piece, and means upon the intermediate arm of the head-piece for locking the same to the pilot-wheel, whereby the said pilot-wheel may be turned angularly in unison with the side wheels or may be free to caster.

21. In a cultivator, the combination with the frame, of side wheels pivotally secured thereto, a pilot-wheel having a vertical spindle journaled in the front portion of the frame, means for causing the side wheels to turn angularly in unison, a T-shaped head-piece loosely mounted upon the pilot-wheel spindle, a rearwardly extending arm rigid with the pilot-wheel spindle above the said T-shaped head-piece, connections between the said head-piece and the means for turning the side wheels in unison, and a dog mounted on the said head-piece and adapted to engage the said rearwardly extending arm to thereby lock the head-piece to the pilot-wheel, whereby the pilot-wheel may be caused to turn in unison with the side wheels or may be disconnected therefrom to caster freely.

22. In a cultivator, the combination of a frame, side wheels pivotally mounted thereon, a three-armed lever pivoted on the frame and having one arm connected with the side wheels, foot levers connected with the other arms of said three-armed lever and pivoted on the frame with their pivots disposed at a right angle to the pivot of the three-armed lever, a pilot wheel at the front of the frame, a second three-armed lever connected with the pilot wheel and having its pivot perpendicular to the pivot of the first-mentioned three-armed lever, and connections between the second-named three-armed lever and the foot-levers whereby all the wheels may be turned angularly in unison.

23. In a cultivator, the combination with the frame having forwardly extending frame-bars, of a transverse frame-bar rigid with said forwardly extending bars and comprising upper and lower members arranged respectively above and below the forwardly extending frame bars, braces connecting the said upper and lower members, and a tongue pivotally mounted at the front ends of the forwardly extending frame-bars having its rear end playing between the upper and lower members of the said transverse frame-bar and between the central braces connecting the said members.

24. The combination, in a wheeled cultivator, of cultivator rigs suspended from the wheeled supporting frame, a sliding trolley-frame on said wheeled frame carrying said rigs and movable laterally bodily therewith, a rig-shifting lever pivoted on the machine frame and also pivoted to said trolley-frame, and a ratchet on the trolley-frame for engagement with a dog on said lever for securing the rigs in different positions.

25. In combination with the wheeled supporting frame, rigs suspended therefrom by pendant laterally swinging hangers at the front ends of the rigs and a sliding trolley-frame in rear of said hangers movable laterally on said supporting frame and having forwardly and downwardly projecting arms pivotally connected with said rigs adjacent to said hangers, rig-lifting levers on said trolley-frame and a rig shifting lever pivoted to said trolley-frame and having a pivotal connection with the supporting frame, and a ratchet on the trolley-frame engaging a pawl or dog on said rig-shifting lever for locking the latter in different positions.

26. A wheeled cultivator having a frame supported on pivoted wheels connected and adapted to operate in unison for steering purposes, foot-levers for operating said wheels, a trolley frame on said supporting frame, gangs of cultivators having their forward ends pivotally connected with laterally movable arms projecting from the trolley frame, a hand-lever pivoted at one end to the wheeled frame and between its ends to said trolley frame, and means for connecting said lever for shifting said gangs, and means for pivoting said hand-lever to said steering wheel connections so as to cause the steering wheels to operate simultaneously with the shifting of the cultivator gangs.

In testimony whereof I affix my signature, in presence of two witnesses.

STALEY D. POOLE.

Witnesses:
EUGENE L. TAYLOR,
ROY E. ANDERSON.

Copies of this patent may be obtained for five cents each, by addressing the "Commissioner of Patents, Washington, D. C."

wheel, whereby the pilot-wheel may be caused to turn in unison with the side wheels or may be disconnected therefrom to caster freely.

22. In a cultivator, the combination of a frame, side wheels pivotally mounted thereon, a three-armed lever pivoted on the frame and having one arm connected with the side wheels, foot levers connected with the other arms of said three-armed lever and pivoted on the frame with their pivots disposed at a right angle to the pivot of the three-armed lever, a pilot wheel at the front of the frame, a second three-armed lever connected with the pilot wheel and having its pivot perpendicular to the pivot of the first-mentioned three-armed lever, and connections between the second-named three-armed lever and the foot-levers whereby all the wheels may be turned angularly in unison.

23. In a cultivator, the combination with the frame having forwardly extending frame-bars, of a transverse frame-bar rigid with said forwardly extending bars and comprising upper and lower members arranged respectively above and below the forwardly extending frame bars, braces connecting the said upper and lower members, and a tongue pivotally mounted at the front ends of the forwardly extending frame-bars having its rear end playing between the upper and lower members of the said transverse frame-bar and between the central braces connecting the said members.

24. The combination, in a wheeled cultivator, of cultivator rigs suspended from the wheeled supporting frame, a sliding trolley-frame on said wheeled frame carrying said rigs and movable laterally bodily therewith, a rig-shifting lever pivoted on the machine frame and also pivoted to said trolley-frame, and a ratchet on the trolley-frame for engagement with a dog on said lever for securing the rigs in different positions.

25. In combination with the wheeled supporting frame, rigs suspended therefrom by pendant laterally swinging hangers at the front ends of the rigs and a sliding trolley-frame in rear of said hangers movable laterally on said supporting frame and having forwardly and downwardly projecting arms pivotally connected with said rigs adjacent to said hangers, rig-lifting levers on said trolley-frame and a rig shifting lever pivoted to said trolley-frame and having a pivotal connection with the supporting frame, and a ratchet on the trolley-frame engaging a pawl or dog on said rig-shifting lever for locking the latter in different positions.

26. A wheeled cultivator having a frame supported on pivoted wheels connected and adapted to operate in unison for steering purposes, foot-levers for operating said wheels, a trolley frame on said supporting frame, gangs of cultivators having their forward ends pivotally connected with laterally movable arms projecting from the trolley frame, a hand-lever pivoted at one end to the wheeled frame and between its ends to said trolley frame, and means for connecting said lever for shifting said gangs, and means for pivoting said hand-lever to said steering wheel connections so as to cause the steering wheels to operate simultaneously with the shifting of the cultivator gangs.

In testimony whereof I affix my signature, in presence of two witnesses.

STALEY D. POOLE.

Witnesses:
EUGENE L. TAYLOR,
ROY E. ANDERSON.

Copies of this patent may be obtained for five cents each, by addressing the "Commissioner of Patents, Washington, D. C."

---

It is hereby certified that in Letters Patent No. 1,075,937, granted October 14, 1913, upon the application of Staley D. Poole, of Moline, Illinois, for an improvement in "Wheeled Cultivators," errors appear in the printed specification requiring correction as follows: Page 2, line 29, strike out the compound word "cross-bar"; page 5, lines 64–65, for the words "said third wheel" read *one of said wheels;* and that the said Letters Patent should be read with these corrections therein that the same may conform to the record of the case in the Patent Office.

Signed and sealed this 9th day of December, A. D., 1913.

[SEAL.]

J. T. NEWTON,
*Acting Commissioner of Patents.*

It is hereby certified that in Letters Patent No. 1,075,937, granted October 14, 1913, upon the application of Staley D. Poole, of Moline, Illinois, for an improvement in "Wheeled Cultivators," errors appear in the printed specification requiring correction as follows: Page 2, line 29, strike out the compound word "cross-bar"; page 5, lines 64–65, for the words "said third wheel" read *one of said wheels;* and that the said Letters Patent should be read with these corrections therein that the same may conform to the record of the case in the Patent Office.

Signed and sealed this 9th day of December, A. D., 1913.

[SEAL.]

J. T. NEWTON,

*Acting Commissioner of Patents.*